(12) United States Patent
Onoe et al.

(10) Patent No.: US 7,065,033 B2  
(45) Date of Patent: Jun. 20, 2006

(54) DIELECTRIC RECORDING MEDIUM, AND METHOD OF AND APPARATUS FOR PRODUCING THE SAME

(75) Inventors: Atsushi Onoe, Saitama (JP); Yasuo Cho, Miyagi (JP)

(73) Assignees: Pioneer Corporation, Tokyo-To (JP); Yasuo Cho, Sendai (JP)

( * ) Notice: Subject to any disclaimer, the term of this patent is extended or adjusted under 35 U.S.C. 154(b) by 504 days.

(21) Appl. No.: 10/382,992

(22) Filed: Mar. 7, 2003

(65) Prior Publication Data
US 2003/0169672 A1    Sep. 11, 2003

(30) Foreign Application Priority Data
Mar. 8, 2002    (JP) .............................. 2002-063053

(51) Int. Cl.
*G11B 9/00*    (2006.01)
(52) U.S. Cl. ..................................... 369/126
(58) Field of Classification Search ..................... None
See application file for complete search history.

(56) References Cited

U.S. PATENT DOCUMENTS

| | | | | |
|---|---|---|---|---|
| 4,139,908 A | * | 2/1979 | Brody | 365/117 |
| 4,490,945 A | * | 1/1985 | Roach | 451/28 |
| 5,132,934 A | * | 7/1992 | Quate et al. | 369/126 |
| 5,808,977 A | * | 9/1998 | Koyanagi et al. | 369/43 |
| 5,946,284 A | * | 8/1999 | Chung et al. | 369/126 |
| 5,985,404 A | * | 11/1999 | Yano et al. | 428/846.1 |
| 6,498,744 B1 | * | 12/2002 | Gudesen et al. | 365/145 |
| 6,515,957 B1 | * | 2/2003 | Newns et al. | 369/126 |
| 6,829,201 B1 | * | 12/2004 | Nishikawa et al. | 369/13.38 |

* cited by examiner

*Primary Examiner*—Thang V. Tran  
*Assistant Examiner*—Tawfik Goma  
(74) *Attorney, Agent, or Firm*—Nixon & Vanderhye P.C.

(57) ABSTRACT

A dielectric recording medium is provided with three layers of: a dielectric material, an electric conductor, and a substrate, and has a groove on the recording surface of the dielectric material. The groove is provided with one or a plurality of grooves. When a voltage is applied to a probe, the dielectric material just under the probe is polarized depending on an electric field generated between the electric conductor and the probe, which allows recording. Moreover, the groove facilitates the probe tracking since the probe scans along this groove.

16 Claims, 10 Drawing Sheets

DIELECTRIC RECORDING MEDIUM, AND METHOD OF AND APPARATUS FOR PRODUCING THE SAME

BACKGROUND OF THE INVENTION

1. Field of the Invention

The present invention relates to a dielectric recording medium for recording information in a dielectric material or reproducing it, and a method of and an apparatus for producing the dielectric recording medium.

2. Description of the Related Art

Recently, many types of dielectric materials and piezoelectric materials have been developed, and most of them are used for ultrasonic elements, optical elements, a memory, and the like. In accordance with the fact, a method of measuring a spontaneous polarization distribution of the dielectric material and local anisotropy of the piezoelectric material has been developed Also, by using this technique, techniques of recording and reproducing information in the dielectric material have been developed.

As a method of producing a dielectric thin film used as a storage medium for recording and reproducing information, the following is known a method of using a vacuum coating apparatus, such as a MOCVD (Metal Organic Chemical Vapor Deposition) method, a sputtering method, and a laser ablation method; and a method of applying and sintering a MO (Metal Organic) material and the like, such as a melt ferroelectric crystal growing method such as a liquid phase epitaxial method, a sol-gel method, and a dipping method. The dielectric thin films prepared by these methods are used as the small capacitor of the storage medium or the non-volatile storage medium of a ferroelectric memory.

On the other hand, a super high-density recording and/or reproducing system in which the dielectric (ferroelectric) thin film is used as a recording medium is proposed by the inventors of the present invention. This apparatus applies a voltage to a probe, which has a small spherical tip, to form a polarization domain and thus information is recorded. With respect to the reproduction of the information, using the function of a SNDM (Scanning Nonlinear Dielectric Microscopy) enables the record in and the reproduction from a domain on the order of nm. A ferroelectric substance as being the recording medium used for this kind of system needs to have an appropriate dielectric constant and an appropriate coercive electric field. Moreover, its polarization direction needs to be uniformly vertical to a recording surface in the domain on the order of nm, and also it needs to be extremely thin such as 1000 Å or less.

However, a conventional method of producing the dielectric thin film has difficulty in preparing the dielectric thin film which meets the conditions for the recording medium used with the above-described SNDM method.

For example, in the sol-gel method of applying and firing or sintering the MO material, it is possible to obtain the dielectric thin film inexpensively because it does not need a vacuum apparatus and the like. However, it is difficult to control the polarization direction, which is required as a prerequisite for a high-recording-density recording medium, and it is also difficult to uniformly form the thin film that is 1000 Å or less. This is because even if the film is uniform immediately after spin-coating, the thin film easily becomes porous by the decomposition and the removal of organic components during the subsequent firing process, and thus, it is not possible to control the generation of growth nuclei of the ferroelectric crystal with uniform size on the order of nm. Moreover, the growth of the crystal thin film by the conventional sol-gel method is generally epitaxial growth to a substrate crystal, and the control of the ferroelectric crystal orientation, i.e. the control of the polarization direction is not performed.

SUMMARY OF THE INVENTION

It is therefore an object of the present invention to provide such a dielectric recording medium that is constructed of a dielectric material appropriate for high-density recording, which is extremely thin and whose polarization direction is uniformly vertical to a recording surface, and that facilitates the probe tracing, as well as a method of and an apparatus for producing the dielectric recording medium.

The above object of the present invention can be achieved by a dielectric recording medium for recording and/or reproducing information using a probe. The dielectric recording medium is provided with; a substrate; an electric conductor disposed on the substrate; a dielectric material disposed on the electric conductor for recording the information with the probe; and a groove on a recording surface of the dielectric material.

According to the dielectric recording medium of the present invention, it is provided with three layers of: the substrate; the electric conductor; and the dielectric material which serves as a recording layer. The groove on which the probe traces is provided in the recording layer of the dielectric material. The provision of this groove can facilitate the probe tracing and tracking in the recording layer when recording or reproducing.

In one aspect of the dielectric recording medium of the present invention, at least the dielectric material just under the groove is a ferroelectric substance.

According to this aspect, at least the portion of the dielectric material under the groove on which the probe traces has a ferroelectric property. According to this, the polarization domain (the presence or absence of the record) becomes clear. Therefore, it can facilitate the probe tracking in the record area, and the record and/or reproduction can be performed in a good condition. Moreover, not only the groove but also the entire surfaces may be formed of the ferroelectric material. As the ferroelectric material, PZT and $LiTaO_3$ are preferably used, for example.

In another aspect of the dielectric recording medium of the present invention, the spontaneous polarization direction of the ferroelectric substance just under the groove is in the vertical direction to the recording surface.

According to this aspect, since the crystal orientation of the ferroelectric substance is unified to be in the vertical direction to the recording surface, the direction of the polarization domain corresponding to record information is also arranged, which allows high-quality recording.

In another aspect of the dielectric recording medium of the present invention, a plurality of the grooves are provided.

According to this aspect, since a plurality of the grooves are provided for the recording surface of the recording medium, it is possible to record an extremely large amount of information, and it is possible to perform the record and/or the reproduction with respect to the plurality of grooves at a time.

In another aspect of the dielectric recording medium of the present invention, the groove is provided concentrically.

According to this aspect, since a plurality of recording tracks exist concentrically and independently, it is possible to record and reproduce a plurality of data at a time, which improves the rate of recording and reproducing, as well as facilitating the administration of the data. Even if there is a track which has a defect, another track can be used instead of the track, and the entire dielectric recording medium can be used without abandoning it. Moreover, since the record and the reproduction can be performed by rotating the recording medium, it is easy to construct a recording and reproducing apparatus.

In another aspect of the dielectric recording medium of the present invention, the groove is provided spirally.

According to this aspect, since the recording track is provided spirally, it is preferable for the record of long and continuous information. It is also possible to take such a construction that a plurality of spiral tracks are independently provided. Moreover, since the record and the reproduction can be performed by rotating the recording medium, it is easy to construct the recording and reproducing apparatus.

In another aspect of the dielectric recording medium of the present invention, the substrate is a silicon substrate.

According to this aspect, the use of the silicon substrate, which is chemically stable as a substrate and which hardly deforms thermally, has a large effect on the maintenance of the planarity of the recording surface and the protection from a mechanical breakdown.

The above object of the present invention can be achieved by a method of producing a dielectric recording medium for recording or reproducing information using a probe. The method is provided with: an application process of applying a liquid material which contains a solvent and a dielectric precursor dissolved in the solvent onto a substrate on one surface of which an electric conductor is provided; a solvent evaporation process of evaporating the solvent after the application process; a forming process of putting the tip portion of the probe into the dielectric precursor laminated on the substrate after the solvent evaporation process; a voltage application process of applying a voltage between the probe and the electric conductor with the dielectric precursor sandwiched between them; and moving process of moving the probe under such a condition that the voltage is applied similarly to the voltage application process.

According to the method of producing the dielectric recording medium of the present invention, it is possible to form a groove on the surface of the dielectric material which becomes the recording surface in the recording medium provided with three layers of the substrate, the electric conductor and the dielectric material, and it is possible to change the dielectric material just under the groove to the ferroelectric crystal. By moving the probe along this groove, it is possible to easily perform the trace for recording and reproducing information. Moreover, since the portion under the groove is such a ferroelectric crystal that its polarization axis direction is unified to be in the vertical direction to the recording surface, the polarization direction of the polarization domain corresponding to the record of information is also unified, which allows high-quality recording and reproducing.

The application process is a process of applying a liquid material which contains a solvent and a dielectric precursor dissolved in the solvent onto the substrate with the electric conductor provided thereon. The dielectric precursor is in a sol state. Alcohol, ester or the like may be used as the solvent. More concretely, MO (Metal Organic) materials may be used as the liquid material. Preferably, the MO materials used as the liquid material may be liquid type sol-gel precursors. For example, "PZT spin-coating solution" manufactured by "KOJUNDO CHEMICAL LAB, CO., LTD." may be used for making a PZT film. A spin coat method or the like may be used. The solvent evaporation process evaporates the solvent from the applied dielectric precursor in a sol state and solidifies it through gel. The degree of the solidification may be such that the portion onto which the probe is put with pressure becomes a concave state. Namely, the organic components of the MO material have not been decomposed completely yet in this process. In the forming process, the tip portion of the probe is put into the dielectric precursor in the solidified state and forms the concave state on the surface of the dielectric precursor. Incidentally, the concave state formation in the forming process can be also performed in the subsequent voltage application process. In the voltage application process, a voltage is applied between the probe and the electric conductor with the dielectric precursor sandwiched between them under such a condition that the concave state is formed on the surface of the dielectric precursor. By a weak electric current flowing because of the application of the voltage, the crystal nucleus of the ferroelectric substance grows in the portion of the dielectric precursor just under the probe from the probe side. Incidentally, even if the forming process, which is the last process, is omitted, it is possible to form the concave state at the same time that the voltage is applied by contacting the surface of the dielectric precursor with the probe and partially pyrolyzing the dielectric precursor using the weak electric current. In the moving process, the probe is moved with the voltage applied and forms the ferroelectric crystal sequentially, as well as forming and stabilizing the groove.

In one aspect of the method of producing the dielectric recording medium of the present invention, the method is further provided with an electric field application process of applying a parallel electric field while firing the dielectric precursor after the moving process.

According to this aspect, by applying the parallel electric field in the vertical direction to the dielectric recording material on which the groove is formed, while firing it, it is possible to crystallize the entire surface of the medium using the crystal formed under the groove as a seed, and it is possible to make the crystal orientation aligned in the vertical direction to the recording surface.

In another aspect of the method of producing the dielectric recording medium of the present invention, the application process uses a spin coat method.

According to this aspect, the dielectric precursor in a sol state can be applied onto the substrate in a predetermined uniform thickness. The film thickness is controlled by controlling the viscosity of the material, the rotational speed of a spinner, and the like.

In another aspect of the method of producing the dielectric recording medium of the present invention, with respect to the application of the dielectric precursor onto the substrate, a sol-gel method is used.

According to this aspect, in the application process, a liquid material in a sol state, i.e. a sol-state liquid material, is used as said liquid material. The sol-state liquid material contains a solvent and a sol-state dielectric precursor. In the application process, according to the sol-gel method, the sol-state liquid material is applied onto the substrate, and the solvent is partially evaporated to make it gel. According to this, it is possible to relatively easily form a dielectric recording thin film in the thickness of 1000 Å, for example.

The above object of the present invention can be achieved by an apparatus for producing a dielectric recording medium for recording or reproducing information using a probe The apparatus is provided with: an application device for applying a liquid material which contains a solvent and a dielectric precursor dissolved in the solvent onto a substrate on one surface of which an electric conductor is provided; a solvent evaporation device for evaporating the solvent; a forming device for putting the tip portion of the probe into the dielectric precursor laminated on the substrate; a voltage application device for applying a voltage between the probe and the electric conductor with the dielectric precursor sandwiched between them; and a moving device for moving the probe under such a condition that the voltage is applied by the voltage application device.

According to the apparatus for producing the dielectric recording medium of the present invention, it is possible to produce the dielectric recording medium provided with three layers of: the substrate, the electric conductor and the dielectric material which has: the groove on the surface of the dielectric material which becomes the recording surface; and the ferroelectric crystal which is just under the probe and whose polarization axis direction is arranged in the vertical direction to the recording medium.

In one aspect of the apparatus for producing the dielectric recording medium of the present invention, it is further provided with an electric field application device for applying a parallel electric field while firing the dielectric precursor after the probe moving by the moving device.

According to this aspect, by applying the parallel electric field to the dielectric recording material on which the groove is formed while firing it, it is possible to produce the dielectric recording medium whose entire surface is crystallized using the crystal formed under the groove as a seed and which has the crystal whose polarization axis orientation is arranged in the vertical direction to the recording surface.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Embodiment of the Dielectric Recording Medium

Figure 1A:
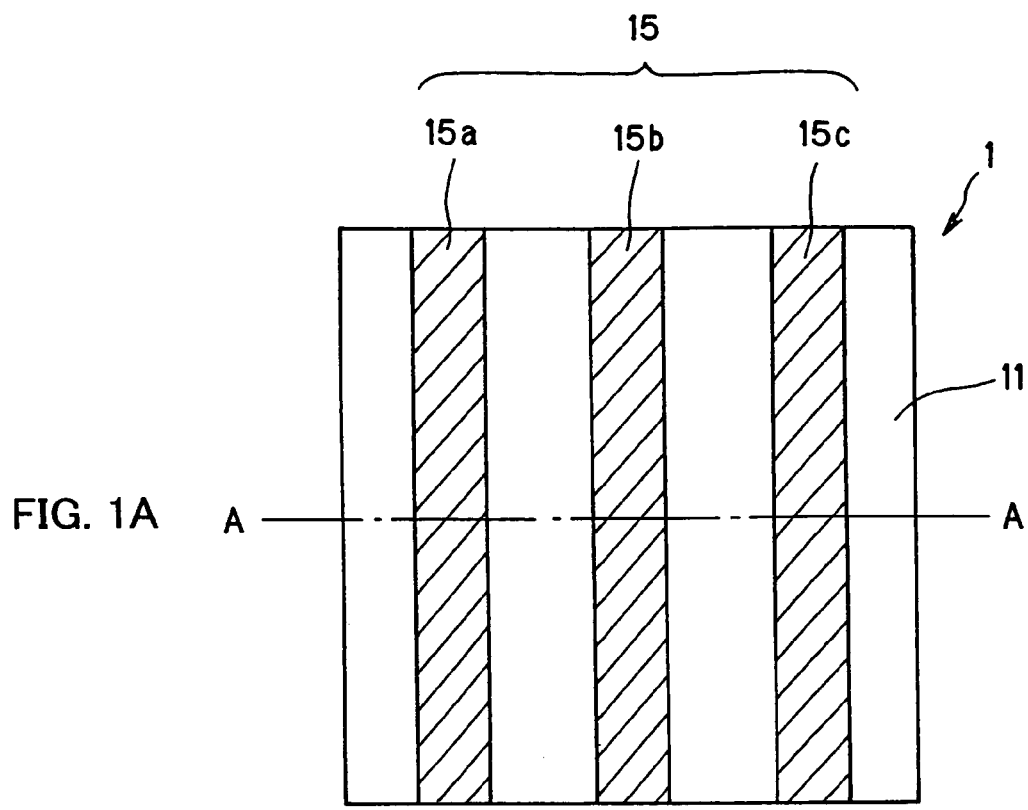
FIG. 1A is a plan view showing the structure of the dielectric recording medium of the present invention.
Figure 1B:
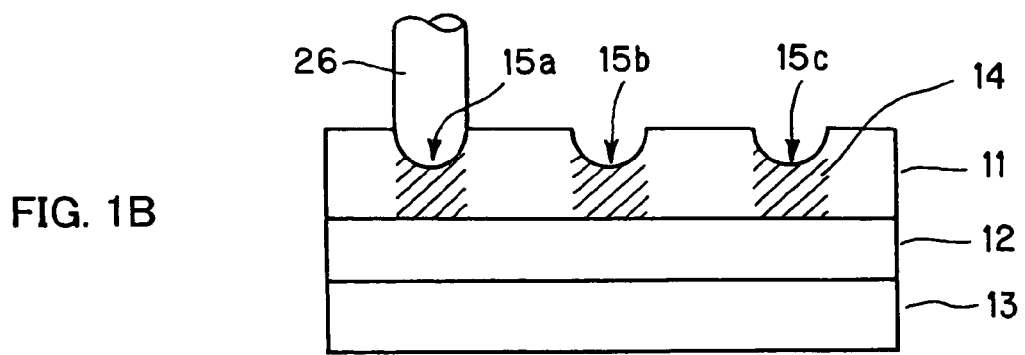
FIG. 1B is an A—A cross sectional side view of FIG. 1A.
Figure 2A:
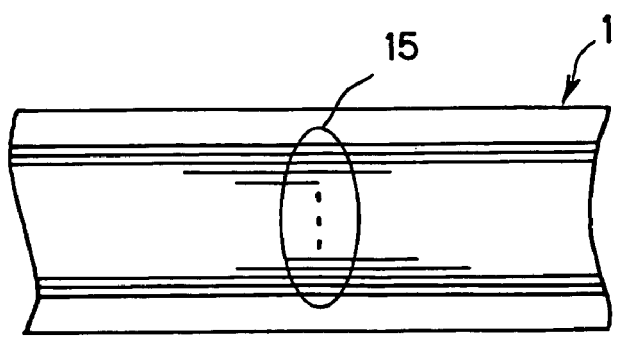
FIG. 2A to FIG. 2C are schematic diagrams showing forms of the dielectric recording medium of the present invention, FIG. 2A showing a tape-shaped or card-shaped medium having a plurality of linear grooves, FIG. 2B showing a disk-shaped medium having a plurality of concentric grooves, and FIG. 2C showing a disk-shaped medium having a spiral groove.
Figure 2B:
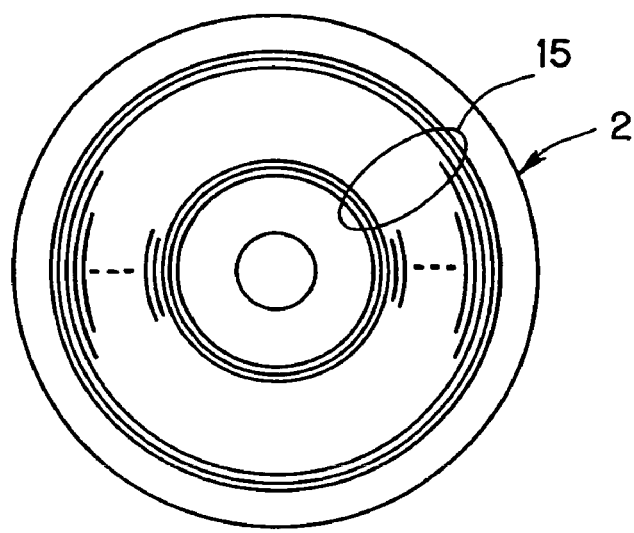
Figure 2C:
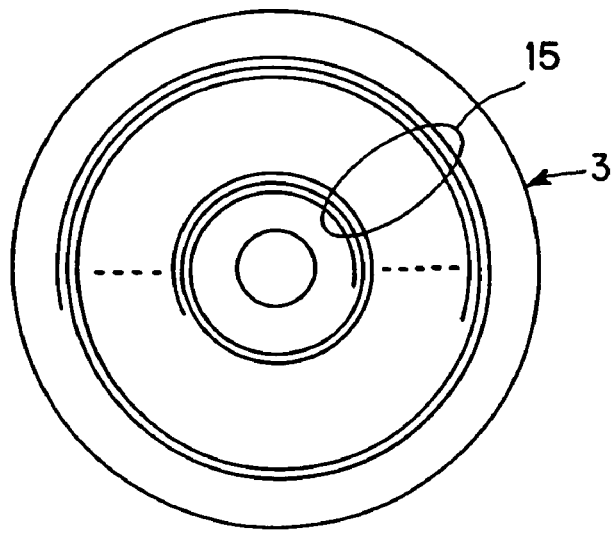

The embodiment of the dielectric recording medium of the present invention will be explained with reference to FIG. 1 and FIG. 2. FIG. 1A is a plan view showing the structure of the dielectric recording medium of the present invention. FIG. 1B is an A—A cross sectional side view of FIG. 1A. FIG. 2A to FIG. 2C are schematic diagrams showing forms of the dielectric recording medium of the present invention, FIG. 2A showing a tape-shaped or card-shaped medium having a plurality of linear grooves, FIG. 2B showing a disk-shaped medium having a plurality of concentric grooves, and FIG. 2C showing a disk-shaped medium having a spiral groove.

As shown in FIG. 1, a dielectric recording medium 1 is provided with three layers of a dielectric material 11, an electric conductor 12, and a substrate 13, and has a groove 15 on the recording surface of the dielectric material 11. The groove 15 is one, or plurality as shown with reference numerals 15a to 15c. The dielectric material 11 under the groove 15 is a ferroelectric crystal 14.

As the dielectric material 11, the following is conceivable: $LiTaO_3$ a PZT material as being a solid solution of $PbTiO_3$—$PbZrO_3$; lead titanate represented as $PbTiO_3$; lead zirconate represented as $PbZrO_3$; barium titanate represented as $BaTiO_8$; lithium niobate represented as $LiNbO_3$; a PLZT material as being a solid solution of lead (Pb), lantern (La), zirconium (Zr), and titanium (Ti); a BNPB material as being a solid solution of bismuth (Bi), sodium (Na), lead (Pb), and barium (Ba); and the like.

The electric conductor 12 may be formed of metal such as aluminum using a method such as vacuum deposition, sputtering, and CVD, and is electrically connected to the ground of a recording/reproducing apparatus. When a voltage is applied to a probe 26 for recording and/or reproducing, the polarization direction of the ferroelectric crystal 14 just under the probe 26 is aligned with the direction of the electric field generated between the electric conductor 12 and the probe 26, which allows recording.

The substrate 13 is intended to preserve the dielectric material 11, which is thin, and the electric conductor 12, and to maintain the planarity. Silicon or the like in a predetermined thickness is used, for example.

The groove 15 is for the probe 26 scanning along this groove and facilitates the probe 26 tracking. Incidentally, the width of the groove 15 is substantially the same as the tip diameter of the probe 26, which is on the order of nm. Therefore, extremely high-density recording is possible.

Furthermore, in order to ensure the convenience of handling the dielectric recording medium 1 having this structure and its strength, a material such as plastic or ceramics may be used to surround it for packaging except the recording and/or reproducing surface.

The function of the dielectric recording medium 1 having the above-described structure as a recording medium is as follows. When a voltage is applied to the probe 26 that abuts on the groove 15 of the dielectric material 11, an electric field is generated between the probe 26 and the electric conductor 12, and the polarization direction of the ferroelectric crystal 14 on a portion on which the probe 26 abuts is aligned with the direction of the applied electric field. By having this polarization reached to the back of the dielectric material 11, a stable polarization domain is formed, and information is recorded in it. On the other hand, with respect to the reproduction, the groove 15 is traced by the probe 26 in a condition that the probe 26 abuts on the groove 15, and the detection of a minute capacity change corresponding to the orientation of a spontaneous polarization is performed by using the SNDM method which is invented by the inventors of the present invention. Thus, the recorded information is reproduced. When recording and/or reproducing, since the probe 26 moves along the groove 15, the trace is performed accurately and easily.

Next, some examples about the shape of the dielectric recording medium will be explained. FIG. 2A shows the tape-shaped or card-shaped dielectric recording medium 1 having a plurality of linear grooves. This can be used for the same application as that of a conventional tape-shaped or card-shaped recording medium by using the predetermined number of grooves 15, a large amount of information can be simultaneously recorded or reproduced, so that its recording and/or reproducing rate improves. Moreover, the individual administration or management of each one of the grooves 15 facilitates data administration and handling. Here, the groove 15 may be the aggregate of individual microdot concave shapes.

FIG. 2B shows a disk-shaped dielectric recording medium 2 having a plurality of concentric grooves 15. This can be used for the same application as that of a conventional disk-shaped recording medium, and a large amount of information can be simultaneously recorded or reproduced by using the predetermined number of grooves 15. Moreover, the individual administration or management of each one of the grooves 15 facilitates data administration and handling.

FIG. 2C shows a disk-shaped dielectric recording medium 3 having a spiral groove 15. This can be used for the same application as that of a conventional CD (Compact Disc) or the like, and it is appropriate for the record and the reproduction of long and continuous information.

(Embodiment Associated with a Method of Producing the Dielectric Recording Medium)

Figure 3:
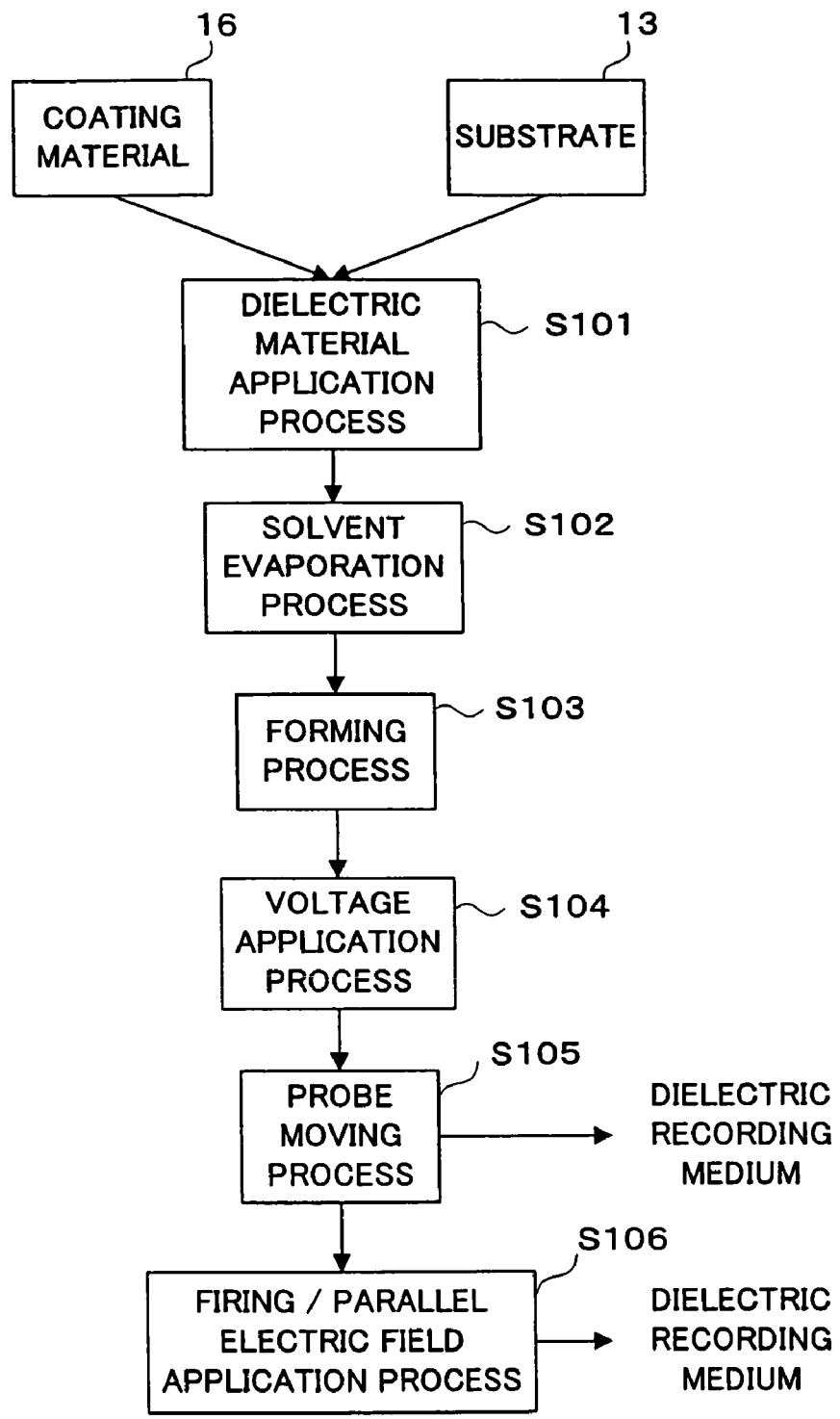
FIG. 3 is a flow chart of production processes showing a method of producing the dielectric recording medium of the present invention.
Figure 4A:
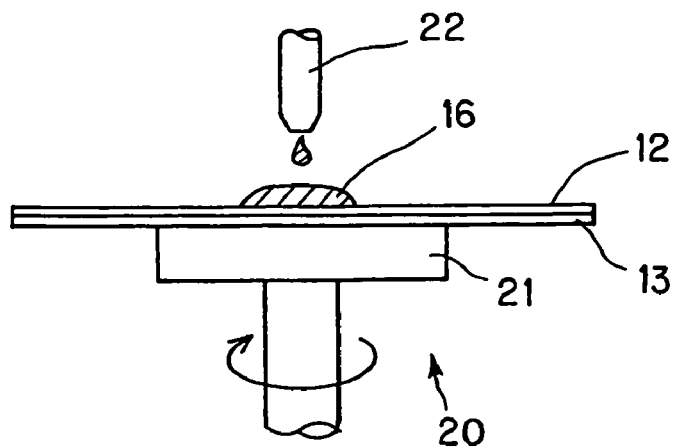
FIG. 4A and FIG. 4B are schematic diagrams showing the processes of producing the dielectric recording medium of the present invention, FIG. 4A showing a process of applying onto a substrate a MO material, which is a sol using a solvent, and FIG. 4B showing a process of evaporating the solvent from the MO material applied and solidifying it through gel.
Figure 4B:
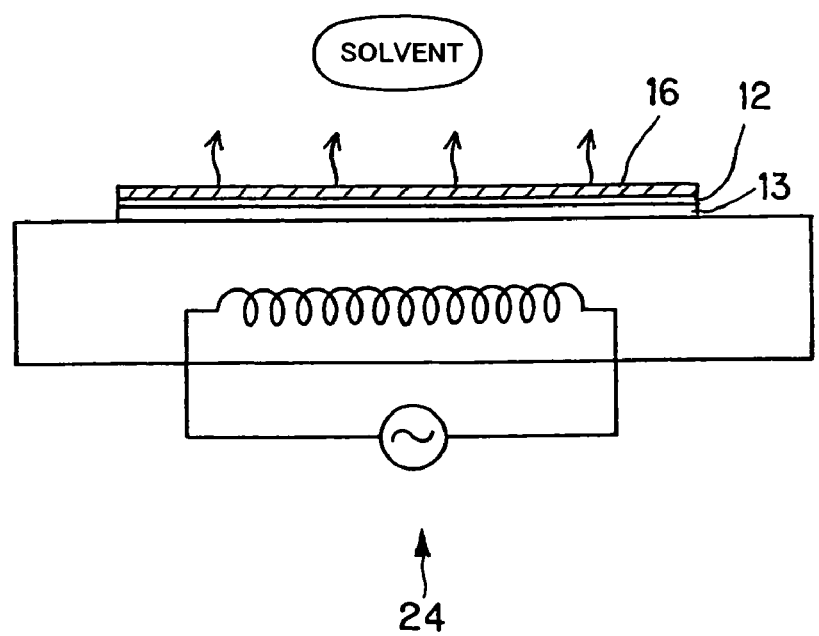

The method of producing the dielectric recording medium of the present invention will be explained with reference to FIG. 3 to FIG. 5F. Incidentally, FIG. 3 is a flow chart of production processes showing a method of producing the dielectric recording medium of the present invention. FIG. 4A and FIG. 4B are schematic diagrams showing the production processes associated with the production method of the present invention. FIG. 5C to FIG. 5F are schematic diagrams following FIG. 4B, showing the production processes.

Firstly, in a dielectric material application process (step S101), a coating material 16 is applied onto the substrate 13. On the substrate 13, which is made of silicon or the like, there is provided the electric conductor 12 by the above-described method or the like, and the coating material 16 is applied thereon. The coating material 16 is a sol obtained by dissolving the MO material, which will be the dielectric material, in a solvent such as alcohol. It is applied so as to be in a predetermined uniform thickness, e.g. about 1000 Å, using a spinner or the like.

Secondly, in a solvent evaporation process (step S102), the solvent in the coating material 16 is evaporated using a heat treatment apparatus or the like, to solidify the MO material, starting from sol through gel. The heat treatment condition is at 150° C. for 3 minutes, for example. The thin film of the MO material at this time point is a dried MO-molecule thin film and does not show a ferroelectric characteristic yet.

Then, in a forming process (step S103), the tip portion of the probe 26, which is electrically conductive, is put into the thin film of the MO material, until the tip portion of the probe 26 subsides into the film to a predetermined depth. The probe 26 has a small hemispherical tip portion whose diameter is on the order of nm, and it is put into as deeply as the hemispherical portion is sunk into the thin film, for example.

Then, in a voltage application process (step S104), a predetermined voltage is applied between the probe 26 and the electric conductor 12 to apply an electric field to the thin film of the MO material. For example, the applied voltage is about 10 V if the film thickness of the MO material is about 1000 Å, and about 5V if about 500 Å, preferably. Incidentally, the voltage which is applied may be direct current voltage or may be alternating current voltage.

By applying the voltage, a weak electric current flows in the thin film of the MO material, which generates heat. By this heat, the crystallization progresses from the surface side of the thin film just under the probe 26 to form the ferroelectric crystal 14 in a microdomain on the order of nm, which is substantially the same as the tip diameter of the probe 26. This shows that even the weak electric current has an enough exothermic energy caused by the thin-film resistance to decompose and crystallize the MO material in the microdomain. Incidentally, the forming process (the step S103) can be omitted and performed at the same time of executing the voltage application process (the step S104). In this case, by contacting the surface of the above-described dielectric precursor with the probe and partially pyrolyzing the above-described dielectric precursor using the weak electric current, the concave state can be formed during the application of voltage.

Moreover, in this process, the electric field is applied vertically to the electric conductor 12 from the probe 26, and the polarization orientation of the crystal can be aligned in the vertical direction to the thin-film surface, so that a poling process can be simultaneously performed with the crystal growth, which is an advantage.

Then, in a probe moving process (step S105), the probe 26 is moved, under the condition of the voltage application process, to form the groove 15. By this process, the groove 15 is formed, and at the same time, the ferroelectric crystal 14 is formed under the groove 15 and the groove 15 is stabilized. This ferroelectric crystal 14 will be a portion where information is recorded into and reproduced from. The moving of the probe 26 may be performed not only by moving the probe 26 itself but also by moving the medium. When a plurality of grooves 15 are formed, a plurality of probes 26 may be used at a time. Moreover, if the spiral groove 15 is formed in the disk-shaped medium, it can be formed by putting the tip portion of the probe 26 into the rotating disk-shaped medium, and at the same time, moving the probe 26 along the radial direction.

As described above, it is possible to prepare the dielectric recording medium having the groove 15 and the ferroelectric crystal 14 under the groove 15 by the above-explained process In addition, passing through a firing/parallel electric field application process (step S106) allows the ferroelectric crystal 14 under the groove 15 to be perfect, and further it allows the crystallization of the entire thin film of the MO material.

In the firing/parallel electric field application process (the step S106), the firing processing of the dielectric recording medium, which is obtained by the probe moving process (the step S105), is performed in a firing apparatus at temperature above the decomposition temperature of the MO material. The firing apparatus has a parallel electrode spacing disposed therein, whose size is large enough to cover the entire dielectric recording medium, and the firing processing is performed while applying a parallel electric field. By this, it is possible to crystallize the entire thin film using the ferroelectric crystal 14, which is obtained by the probe moving process and the former processes, as a seed, and it is possible to obtain the ferroelectric crystal 14 whose crystal orientation orients in the vertical direction to the thin-film surface by the applied voltage.

Next, the specific configuration of each process described above will be explained. FIG. 4A shows a process of applying onto the substrate 13 the MO material, which is a sol using a solvent such as alcohol; namely, the coating material 16 including the dielectric material. The process corresponds to the dielectric material application process in FIG. 3. The substrate 13 on which the coating material 16 is disposed is placed on a spinner head 21 of a spinner 20. The coating material 16 is dropped from a nozzle 22 which is above the center of the spinner head 21, and due to the rotation of the spinner 20, the coating material 16 is applied onto the entire surface of the substrate 13 in a thin and uniform thickness. The viscosity of the coating material 16, the drop amount, the rotational speed of the spinner 20 and the like are controlled so as to obtain the thin film thickness, for example, 1000 Å. In the dielectric material application process, the material can be applied without any alteration or change in property by filling the spinner inside on which the substrate 13 is placed with dry inert gas such as nitrogen.

FIG. 4B shows a process of evaporating the solvent from the coating material 16 and solidifying it starting from sol through the gel. The process corresponds to the solvent evaporation process in FIG. 3. The substrate 13 on which the coating material 16 is applied is placed on a heating apparatus 24 to evaporate the solvent from the coating material 16 and solidify it. The solidified state is controlled by the heating temperature, the heating time, and the like. Incidentally, the coating material 16 is referred to as the dielectric material 11 after being solidified.

Figure 5C:
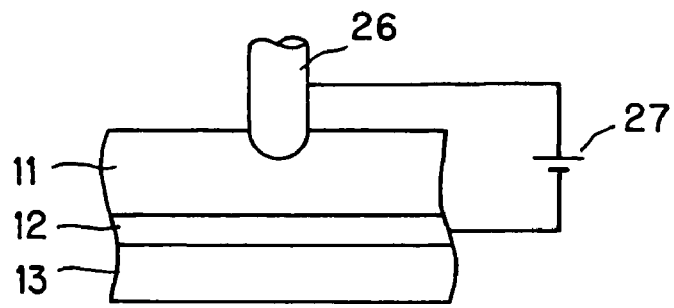
FIG. 5C to FIG. 5F are schematic diagrams following FIG. 4B, showing the processes of producing the dielectric recording medium of the present invention, FIG. 5C showing a process of forming a groove and a ferroelectric crystal in the MO material in a solidified state, FIG. 5D showing the dielectric recording medium formed in the process in FIG. 5C, FIG. 5E showing a process of applying a parallel electric field to the dielectric recording medium formed in the process in FIG. 5C while firing it, and FIG. 5F showing the dielectric recording medium formed in the process in FIG. 5E.
Figure 5D:
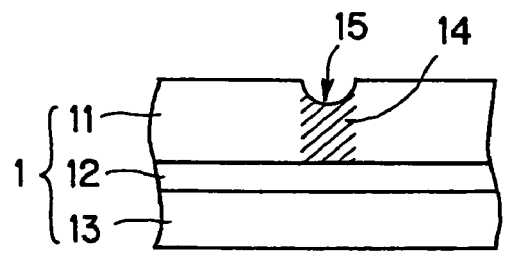

Next, FIG. 5C shows a process of forming the groove 15. The tip portion of the probe 26 is put into the dielectric material 11 on the substrate 13 with pressure, such that the tip portion subsides into the film to a predetermined depth. The probe 26 moves under this condition along the direction perpendicular to the plane of the drawing, and at the same time, a voltage is applied between the probe 26 and the electric conductor 12. This process corresponds to the aggregation of the forming process, the voltage application process, and the probe moving process in FIG. 3. The groove 15 is formed in the portion into which the tip portion of the probe 26 is put, and the ferroelectric crystal 14 is formed under the groove 15 by the applied voltage. FIG. 5D is a sectional view in the vertical direction to the groove 15, showing the dielectric material 11 with the groove 15 and the crystal 14 formed. By these processes, the dielectric recording medium 1 associated with the present invention is formed.

Figure 5E:
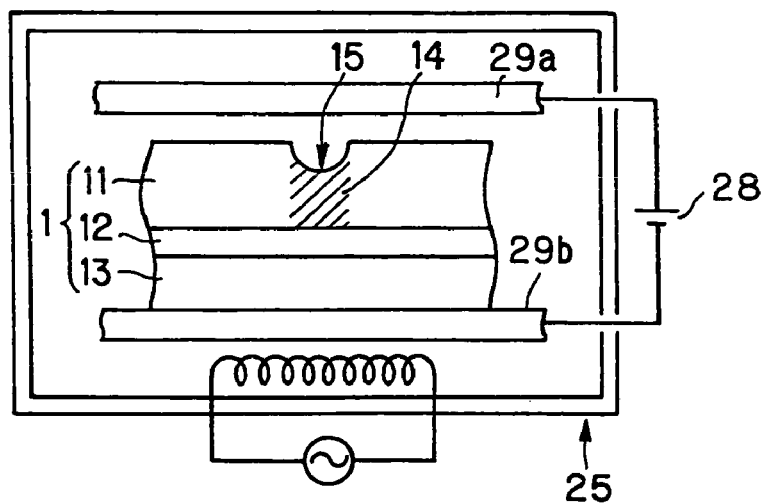
Figure 5F:
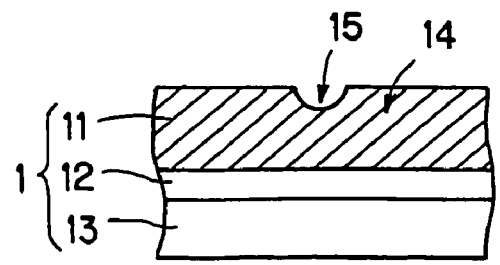

FIG. 5E shows a process of further firing and applying a parallel electric field to the dielectric recording medium 1 formed in the process in FIG. 5C. The dielectric recording medium 1 is placed between electrodes 29*a* and 29*b* in a firing apparatus 25, where the firing process is performed at temperature above the decomposition temperature of the MO material while the parallel electric field is applied thereto. This process corresponds to the firing/parallel electric field application process in FIG. 3. By this, it is possible to crystallize the entire thin film using the formed ferroelectric crystal 14 as a seed, and it is possible to obtain the ferroelectric crystal 14 whose crystal orientation orients in the vertical direction to the thin-film surface by the applied voltage. FIG. 5F is a sectional view of the dielectric recording medium in the final mode formed in these processes.

Embodiment Associated with an Apparatus for Producing the Dielectric Recording Medium The embodiment associated with the apparatus for producing the dielectric recording medium of the present invention will be explained with reference to FIG. 6 and FIG. 7.

Figure 6:
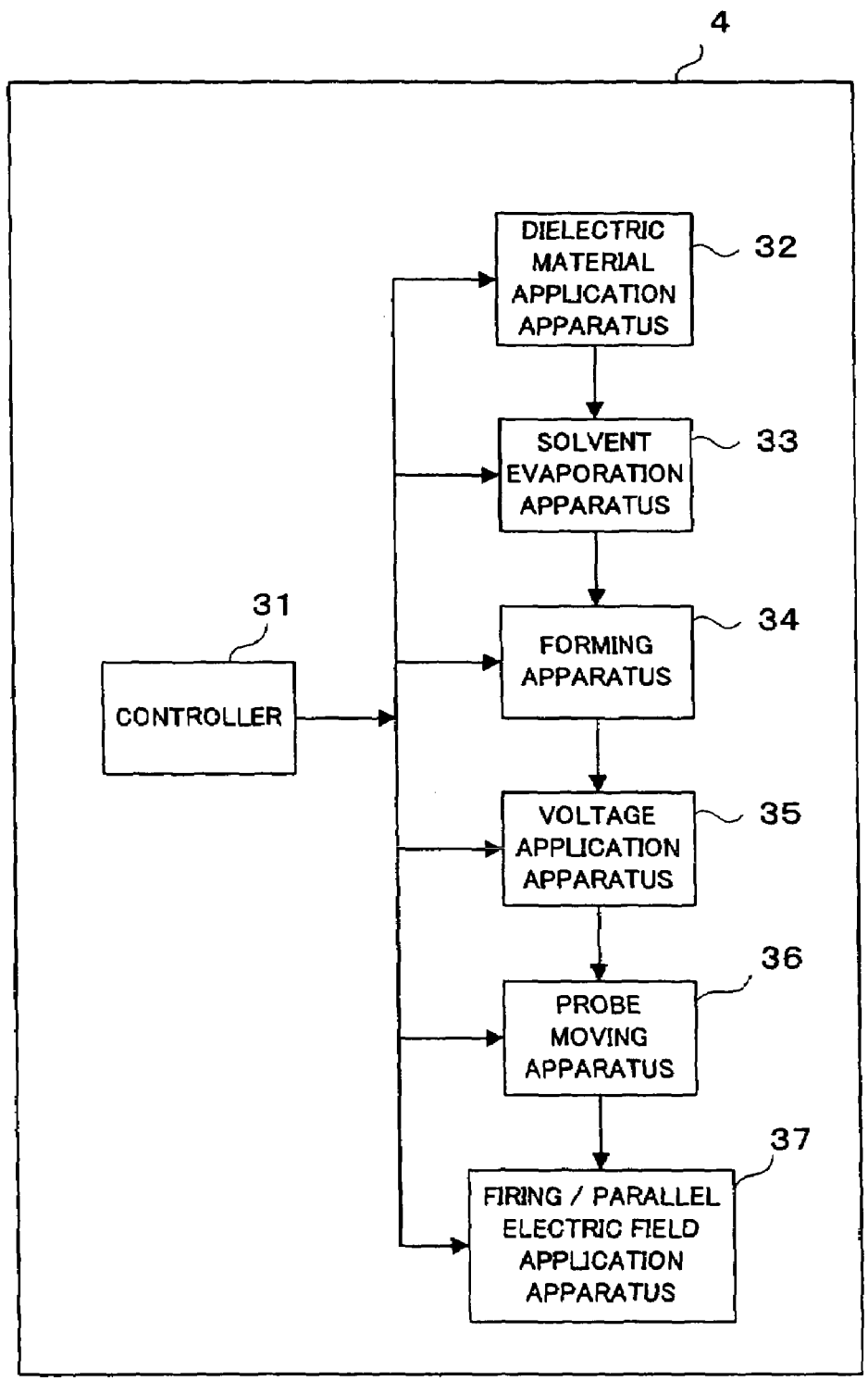
FIG. 6 is a block diagram showing the configuration of an apparatus for producing the dielectric recording medium of the present invention.

As shown in FIG. 6, an apparatus 4 for producing the dielectric recording medium is provided with: a dielectric material application apparatus 32; a solvent evaporation apparatus 33; a forming apparatus 34; a voltage application apparatus 35; a probe moving apparatus 36; a firing/parallel electric field application apparatus 37; and a controller 31 for controlling these apparatuses.

The dielectric material application apparatus 32 is a device for applying the MO material dissolved in a solvent onto the substrate on which the electric conductor 12 is formed, and a spinner is used, for example. The MO material is applied onto the substrate 13 in a predetermined thickness. The application thickness is controlled by controlling the viscosity of the MO material, the rotational speed of the spinner, and the like.

The solvent evaporation apparatus 33 is a device for evaporating the solvent from the dielectric material 11 applied on the substrate 13, and a heating apparatus 24 such as a hot plate is used. The control of evaporating the solvent and solidifying the dielectric material 11 is performed by controlling the heating temperature, the heating time, and the like.

The forming apparatus 34 is a device for putting the tip portion of the probe 26 into the dielectric material 11 applied on the substrate 13 and forming the groove 15. The depth of the groove 15 which is formed is controlled by controlling elastic force applied to the probe 26 with a spring or the like. Alternatively, it is also controlled by mechanically setting the position of the probe 26 in the vertical direction to the recording surface.

The voltage application apparatus 35 is a device for applying a voltage between the probe 26 and the electric conductor 12. It transforms the dielectric material 11 just under the probe 26 to the ferroelectric crystal 14 by applying the voltage. The applied voltage may be direct current voltage or may be alternating current voltage. The applied voltage is controlled to a preferable value depending on the film thickness of the dielectric material 11.

The probe moving apparatus 36 is a device for moving the probe 26 under such a condition that the tip portion of the probe 26 is put into the dielectric material 11 with a voltage applied to the probe. It forms the groove 15 on the surface of the dielectric material 11. The moving speed is controlled to a speed with which the crystal 14 in a good condition is formed just under the probe 26.

The firing/parallel electric field application apparatus 37 is a device for firing the dielectric recording medium prepared by the above-described apparatuses in the parallel electric field. It changes the entire thin film to the crystal, which orients in the vertical direction to the recording surface, using the ferroelectric crystal 14 which is formed just under the probe 26 as a seed. It forms the dielectric recording medium having the ferroelectric crystal in high quality.

Figure 7:
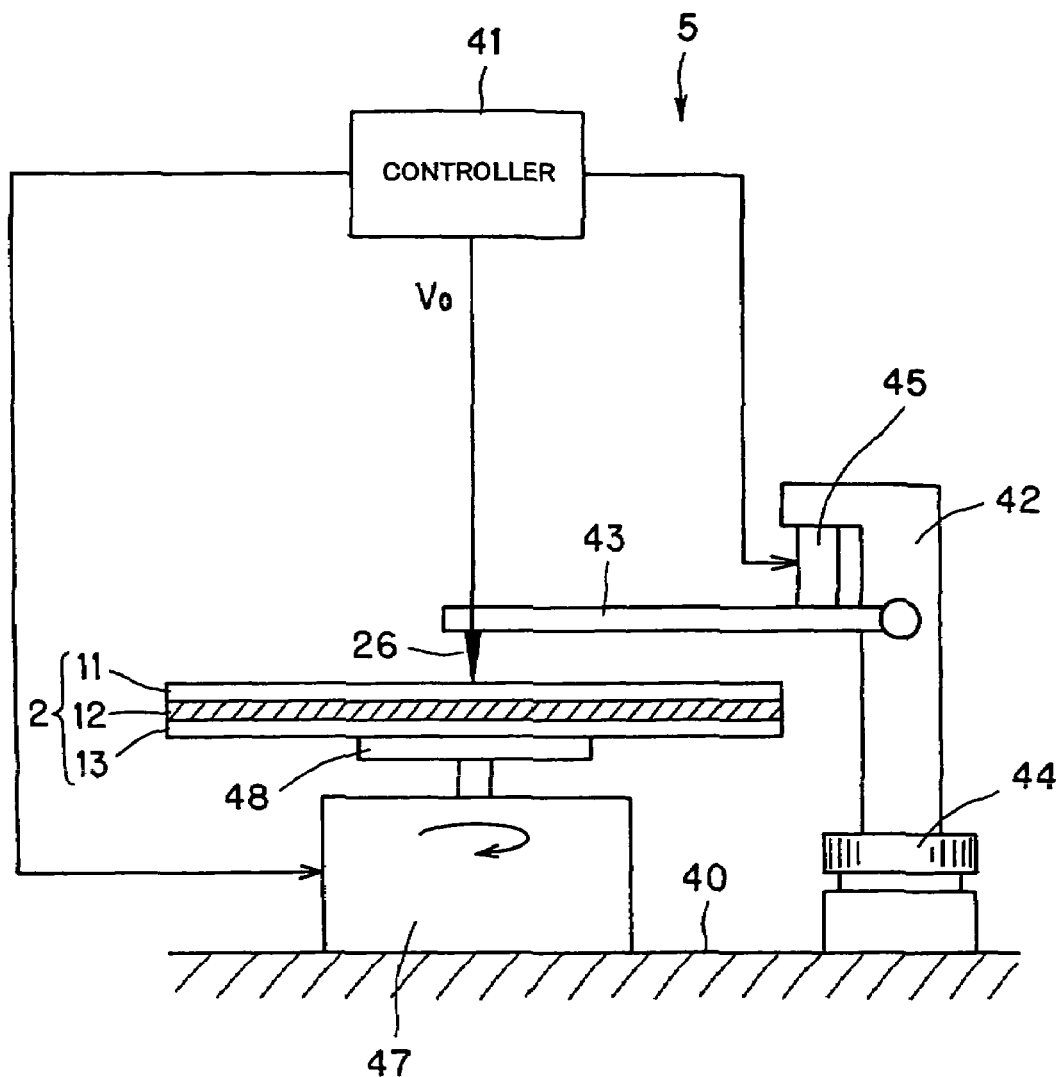
FIG. 7 is a schematic diagram showing one example of an apparatus for forming the groove of the dielectric recording medium.

FIG. 7 is a schematic diagram showing one example of an apparatus 5 for forming the groove, which forms the groove 15 and the crystal 14 and which is applied to the preparation of the disk-shaped dielectric recording medium 2 or 3. The groove 15 and the crystal 14 are formed by putting the tip portion of the probe 26 into the dielectric material 11, applying a voltage thereto, rotating the dielectric recording medium, and moving the probe 26. The probe 26 is attached to one end of an arm 43 which is disposed to a support pole 42 on a base 40 and the other end of the probe 26 is put into the dielectric material 11. The support pole 42 is provided with a coarse adjustment device 44 and a fine adjustment device 45, adjusting the pressure of the probe 26 to the dielectric material 11. The coarse adjustment device 44 is constructed with a precision screw, for example. On the other hand, the fine adjustment device 45 is constructed with a piezoelectric element, for example, precisely adjusting the position of the arm 43 by controlling a voltage which is applied to the piezoelectric element. The dielectric recording medium 2 is placed and rotated on a table 48 of a motor 47. The probe 26 is moved by a feed mechanism, which is not illustrated, along the radial direction of the disk, to form the groove 15 which is concentric or spiral.

As described above, the apparatus 5 for forming the groove includes the forming apparatus 34, the voltage application apparatus 35, and the probe moving apparatus shown in FIG. 6. Incidentally, with respect to the dielectric recording medium 1 which is tape-shaped or card-shaped, it is also possible to form the groove 15 and the ferroelectric crystal 14 as well by utilizing a structure in which the dielectric recording medium 1 is set on a linear feeding mechanism. Not limited to the above-described explanation, any mechanism and means having the similar functionality can be used to form the dielectric recording mediums 1, 2, and 3.

Figure 8:
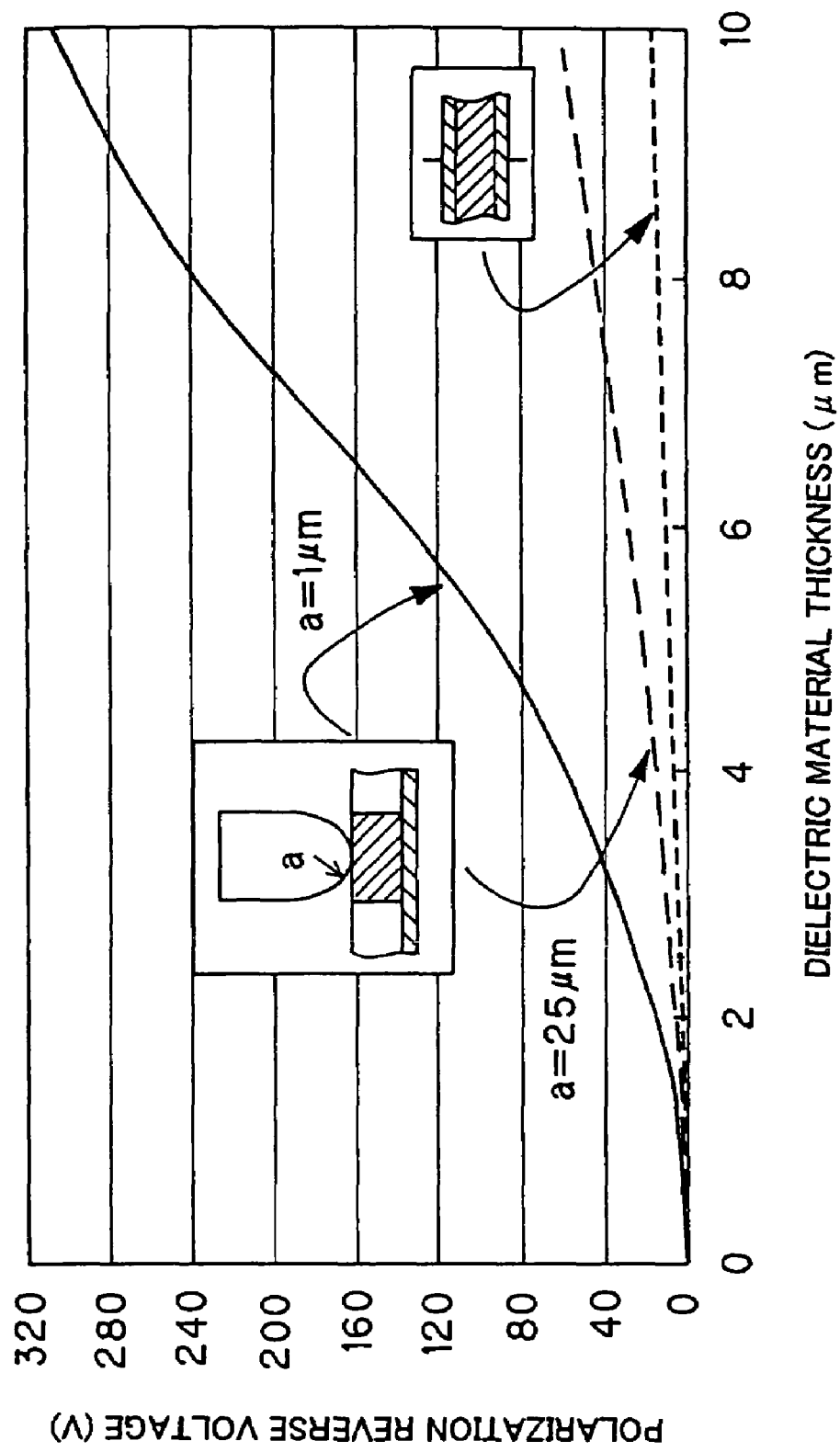
FIG. 8 is a schematic diagram showing the relationship between a dielectric substance thickness and a minimum voltage required for a reversal of a polarization domain, with a probe radius as a parameter.

The relationship between thickness of a dielectric substance and minimum voltage required for reversal of a polarization domain will now be explained with reference to FIG. 8. Although FIG. 8 shows the relationship in the case that the thickness of the dielectric recording medium and the diameter of the tip portion of the probe are on the order of µm, it is confirmed that if the thickness of the dielectric recording medium and the diameter of the tip portion of the probe are reduced to the order of nm, the relationship similar to that shown in FIG. 8 can be obtained. Since the polarization domain corresponding to the record has substantially the same size as the diameter of the probe, it is preferable to make the diameter small in order to perform the high-density recording. On the other hand, FIG. 8 teaches that the voltage required to form the polarization domain becomes higher as the dielectric substance becomes thicker. Especially, when the diameter of the probe is small, the required voltage increases more rapidly as the thickness of the dielectric substance increases. Therefore, the dielectric substance should be thin for the usability of low voltage operation. The dielectric recording medium of the present invention is formed such that the thickness of its dielectric material 11 is controlled to be uniform and thin, such as about 1000 Å, which meets this requirement.

Figure 9:
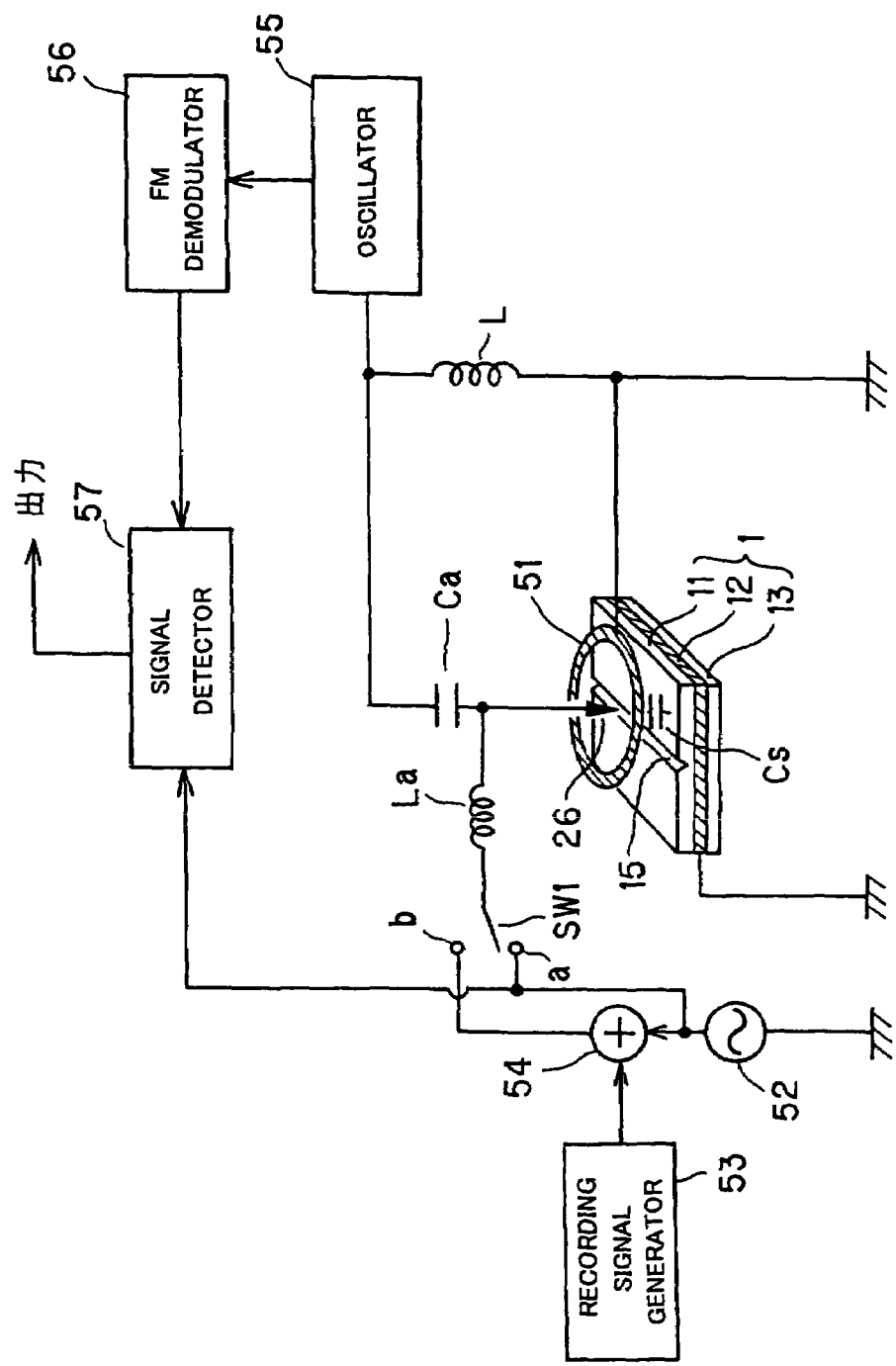
FIG. 9 is a schematic diagram showing one example of an information recording/reproducing apparatus which uses the dielectric recording medium associated with the present invention.
Figure 10:
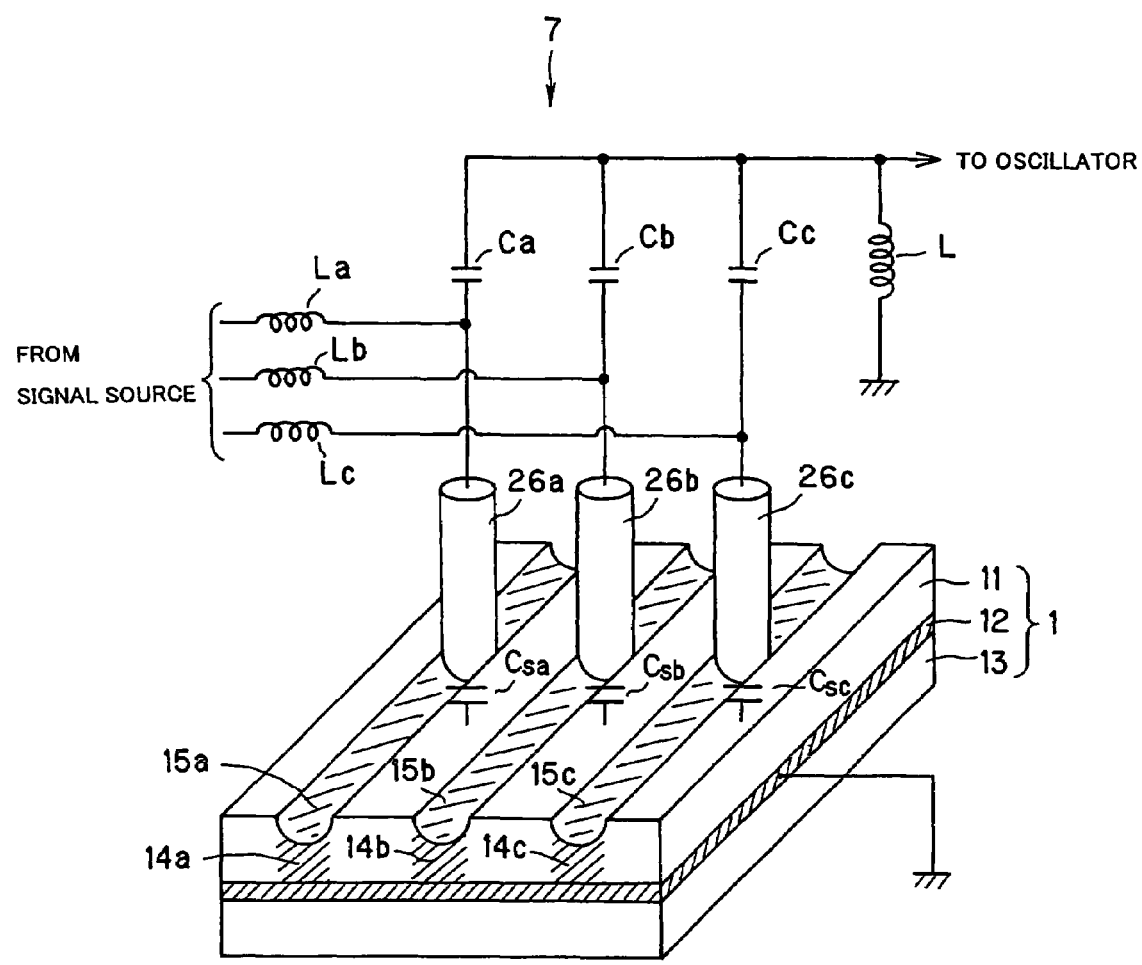
FIG. 10 is a schematic diagram showing one example of an information recording/reproducing apparatus which uses the dielectric recording medium having the plurality of grooves associated with the present invention.

Information recording/reproducing apparatus which uses the dielectric recording medium of the present invention Next, the information recording/reproducing apparatus which uses the dielectric recording medium of the present invention will be explained with reference to FIG. 9 and FIG. 10. FIG. 9 is a schematic diagram showing the block configuration of an information recording/reproducing apparatus 6 which uses the dielectric recording medium which is provided with one groove 15. FIG. 10 is a schematic diagram showing the important part of an information recording/reproducing apparatus 7 which uses the dielectric recording medium having the plurality of grooves 15.

As shown in FIG. 9, the information recording/reproducing apparatus 6 is provided with: the card-shaped dielectric recording medium 1; the probe 26; an electrode 51; an AC (Alternating Current) signal generator 52; a recording signal generator 53; an adder 54; an oscillator 55; a FM (Frequency Modulation) demodulator 56; a signal detector 57; an inductor L, an inductor La; a capacitance Ca; and a switch SW1. In addition, it is obviously provided with various general functions as the information recording apparatus.

The probe 26 is a hemispherical member having a predetermined radius at the tip, and at least its surface has conductivity to apply a voltage. When information is recorded, the voltage is applied to this probe 26, the polarization domain is formed in the ferroelectric crystal 14 of the groove 15. This corresponds to record information. On the other hand, when the information is reproduced, the polarization domain of the ferroelectric crystal 14 of the groove 15 is traced by the probe 26 to pick up the record information. The trace is performed by the probe 26 tracking along the groove 15. Since the dielectric recording medium associated with the present invention has the groove 15 for this tracking, it is possible for the probe 26 to scan easily.

The electrode 51 is a return electrode for the high-frequency electric field that is generated by the oscillator 55 and applied to the microdomain of the dielectric recording medium 1 through the probe 26.

The AC signal generator 52 is a device for generating an AC signal which is applied to the probe 26. It applies an alternating electric field to the microdomain of the dielectric substance and modulates reading signals at the time of reading information so as to ensure the separation of the reading signals. Moreover, The AC signal generator 52 biases a recording signal from the recording signal generator 53 and applies the biased recording signal to the probe 26 to record the information. The difference in a capacitance Cs just under the probe 26 corresponding to the polarization state causes the oscillation frequency of the oscillator 55 to be modulated. By demodulating this, it is possible to monitor whether an accurate recording operation is performed.

When the information is read out, the SW1 is connected to the side of a terminal a. When the information is written, the SW1 is connected to the side of a terminal b.

The recording signal generator 53 converts information which is to be recorded in the dielectric recording medium 1 to a signal in the format appropriate for recording. The voltage level, the pulse width, and the like thereof are also set optimally and are output.

The adder 54 adds the signal for recording from the recording signal generator 53 and the AC signal from the AC signal generator 52 to modulate and apply them to the probe 26.

The oscillator 55 generates a signal used for the readout of the recorded information by frequency modulation. The oscillation frequency is set to about 1 GHz, for example.

The inductor La and the capacitance Ca constitute a low-cut (LC) filter installed in order to prevent the AC signal of the AC signal generator 52 from interfering with the oscillator 55. The oscillation frequency of the oscillator 55 is on the order of 1 GHz, so that even if the AC signal of the AC signal generator 52 is on the order of MHz, it is substantially possible to separate them using the simple LC filter. Moreover, increasing the frequency of the AC signal indicates increasing a data transfer rate, and in that case, a filter constant appropriate for the case may be selected.

The inductor L constitutes a resonance circuit with the capacitance Cs corresponding to the polarization domain just under the probe 26. The change of the capacitance Cs causes the change of the resonance frequency, resulting in frequency-modulating the oscillation signal of the oscillator 55. By demodulating this frequency-modulation, it is possible to read the recorded information. Here, although there is the capacitance Ca in the resonance circuit, since the capacitance Cs is extremely small as compared to the capacitance Ca, the capacitance Cs is a dominant factor with respect to the resonance frequency.

The FM demodulator 56 demodulates the oscillation signal of the oscillator 55, which is frequency-modulated by the resonance circuit constructed with the inductor L and the capacitance Cs. A typical FM detection device is used for this.

The signal detector 57 performs coherent detection on the signal demodulated at the FM demodulator 56, using the AC signal from the AC signal generator 52 as a synchronization signal, and reproduces the recorded information.

Next, the record operation of the information recording/reproducing apparatus 6 will be explained. The SW1 is connected to the terminal b. Firstly, information to be recorded is input to the recording signal generator 53. In the recording signal generator 53, the information to be recorded is converted into a predetermined format appropriate for recording and is output as a digital recording signal having the set voltage level and the set pulse width.

The recording signal from the recording signal generator 53 is applied to the probe 26 via the inductor La. Then, by the electric field generated between the probe 26 and the electric conductor 12 of the dielectric recording medium 1, the polarization domain is formed in the ferroelectric crystal 14 of the groove 15 of the dielectric recording medium 1, resulting in recording the information.

Monitoring a recorded information is performed by frequency-modulating the oscillation frequency of the oscillator 55 using the resonance circuit of the inductor L and the capacitance Cs just under the probe 26 corresponding to the formed polarization domain, demodulating this frequency-modulated signal with the FM demodulator 56, and performing a coherent detection at the signal detector 57 with the AC signal of the AC signal generator 52 as the synchronization signal.

Next, the reproduction operation of the information recording/reproducing apparatus 6 will be explained. The SW1 is connected to the terminal a. To the probe 26, the AC signal is applied from the AC signal generator 52. This AC signal will be the synchronization signal in the coherent detection. When the probe 26 tracks the groove 15, the capacitance Cs corresponding to the polarization domain, i.e. the capacitance Cs corresponding to the record information is detected. The oscillation frequency of the oscillator 55 is modulated by the resonance frequency of the resonance circuit constructed with the capacitance Cs and the inductor L. This frequency-modulated signal is demodulated in the FM demodulator 56, and the coherent detection is performed in the signal detector 57 with the AC signal of the AC signal generator 52 as the synchronization signal, resulting in reproducing the record information.

The signal picked up in this manner is reproduced with the AC signal of the AC signal generator 52 as the synchronization signal, and thus the information which is recorded is reproduced. Incidentally, with respect to a device used for the coherent detection, any device can be used if it is a circuit for reproducing a signal synchronously with the AC signal of the AC signal generator 52, such as a lock-in amplifier.

Next, the information recording/reproducing apparatus 7, which uses the dielectric recording medium provided with the plurality of grooves 15, will be explained with reference to FIG. 10. Incidentally, the reproducing apparatus 7 differs from the above-described information recording/reproducing apparatus 6 in that this apparatus has a plurality of grooves 15a to 15c and a plurality of probes 26a to 26c corresponding to them. With respect to the common configuration with the information recording/reproducing apparatus 6, the explanation regarding the apparatus 6 will be referred. Moreover, the same is true in the case of an apparatus having further more grooves 15.

The probes 26a to 26c are provided corresponding to the grooves 15a to 15c of the dielectric recording medium 1. There are also disposed the AC signal generators, the recording signal generators, the adders, and SWs for switching signals at the time of recording and/or reproducing, all of which are not illustrated. The signals are provided for the probes 26a to 26c via the inductors La to Lc, respectively.

As the record operation of the information recording/reproducing apparatus 7, the signals for recording from the recording signal generators are modulated using different frequencies from the AC signal generators, and are provided for the probes 26a to 26c via the inductors La to Lc, respectively. By voltages provided for the probes 26a to 26c, the electric fields are generated between the ferroelectric crystals 14 of the grooves 15 of the dielectric recording medium 1 and the electric conductor 12, and the polarization domains are formed on the basis of these electric fields. Each of the probes 26a to 26c is moved along the respective one of the grooves 15a to 15c, and information is recorded sequentially. The movement of the probes 26a to 26c along the respective grooves 15a to 15c extremely facilitates the control of the tracking.

Just under the probes 26a to 26c, the capacitances Csa to Csc are formed which correspond to the polarization domains and which correspond to the recorded information. With respect to the record condition, it is possible to monitor the record condition of the information provided for the probes 26a to 26c by modulating the oscillation frequency of the oscillator with the resonance frequencies of the resonance circuits constructed with the capacitances Csa to Csc, the capacitances Ca to Cc and the inductor L, demodulating the modulated signals with the FM demodulator, and synchronizing the demodulated signals with the AC signals from the AC signal generators.

Next, with respect to the reproduction operation of the information recording/reproducing apparatus 7, the signals with the different frequencies from the AC signal generators are provided for the probe 26a to 26c via the inductors La to Lc, respectively. When the probes 26a to 26c trace the respective grooves 15a to 15c, the capacitances Csa to Csc corresponding to the polarizations just under the probes 26a to 26c, i.e. the capacitances Csa to Csc corresponding to the recorded information are detected. The oscillation frequency of the oscillator is modulated with the resonance frequencies of the resonance circuits constructed with these capacitances Csa to Csc, the capacitances Ca to Cc and the inductor L. The modulated signals are then demodulated with the FM demodulator. The demodulated signals are then synchronized with the AC signals from the AC signal generators. In such a manner, it is possible to separate and reproduce the information which is picked up with each of the probes 26a to 26c.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-063053 filed on Mar. 8, 2002 including the specification, claims, drawings and summary is incorporated herein by reference in its entirety.

What is claimed is:

1. A dielectric recording medium for recording information by aligning polarization directions with a probe such that the polarization directions correspond to the information, comprising:
  a substrate;
  an electric conductor disposed on said substrate;
  a ferroelectric material disposed on said electric conductor for recording the information with the probe; and
  a groove on a recording surface of said ferroelectric material for tracking with the probe,
  wherein the polarization directions of the ferroelectric material at least under the groove are in a vertical direction to the recording surface.

2. The dielectric recording medium according to claim 1, wherein a plurality of said grooves are provided.

3. The dielectric recording medium according to claim 1, wherein said groove is provided concentrically.

4. The dielectric recording medium according to claim 1, wherein said groove is provided spirally.

5. The dielectric recording medium according to claim 1, wherein said substrate is a silicon substrate.

6. A method of producing a dielectric recording medium for recording information by aligning polarization directions with a probe such that the polarization directions correspond to the information, comprising:
  an application process of applying a liquid material which contains a solvent and a dielectric precursor dissolved in the solvent onto a substrate on one surface of which an electric conductor is provided;
  a solvent evaporation process of evaporating the solvent after said application process;
  a forming process of putting a tip portion of the probe into the dielectric precursor laminated on the substrate after said solvent evaporation process;
  a voltage application process of applying a voltage between the probe and the electric conductor with the dielectric precursor sandwiched between them after said forming process; and
  a moving process of moving the probe under such a condition that the voltage is applied,
  wherein, in the forming process, the tip portion of the probe is put into the dielectric precursor such that the tip portion of the probe subsides into the dielectric precursor, and
  in the moving process, a groove is formed on the dielectric precursor by moving the probe.

7. The method of producing a dielectric recording medium according to claim 6, further comprising an electric field application process of applying a parallel electric field while firing the dielectric precursor after said moving process.

8. The method of producing a dielectric recording medium according to claim 6, wherein said application process uses a spin coat method.

9. The method of producing a dielectric recording medium according to claim 6, wherein, with respect to the application of the dielectric precursor onto the substrate, a sol-gel method is used.

10. An apparatus for producing a dielectric recording medium for recording information by aligning polarization directions with a probe such that the polarization directions correspond to the information, comprising:
  an application device for applying a liquid material which contains a solvent and a dielectric precursor dissolved in the solvent onto a substrate on one surface of which an electric conductor is provided;
  a solvent evaporation device for evaporating the solvent;
  a forming device for putting a tip portion of the probe into the dielectric precursor laminated on the substrate;
  a voltage application device for applying a voltage between the probe and the electric conductor with the dielectric precursor sandwiched between them; and
  a moving device for moving the probe under such a condition that the voltage is applied by said voltage application device,
  wherein, the forming device puts the tip portion of the probe into the dielectric precursor such that the tip portion of the probe subsides into the dielectric precursor, and
  the moving device forms a groove on the dielectric precursor by moving the probe.

11. The apparatus for producing a dielectric recording medium according to claim 10, further comprising an electric field application device for applying a parallel electric field while firing the dielectric precursor after the probe moving by said moving device.

12. The dielectric recording medium according to claim 1, wherein the width of the groove is substantially the same as the tip diameter of the probe.

13. The method of producing a dielectric recording medium according to claim 6, wherein, in the voltage application process, a dielectric crystal is formed in the dielectric precursor by applying the voltage with the dielectric precursor.

14. The method of producing a dielectric recording medium according to claim 13, wherein, in the voltage application process, polarization directions of the dielectric crystal are aligned in a vertical direction with respect to the surface of the dielectric recording medium.

15. The apparatus for producing a dielectric recording medium according to claim 10, wherein the voltage application device forms a dielectric crystal in the dielectric precursor by applying the voltage with the dielectric precursor.

16. The apparatus for producing a dielectric recording medium according to claim 15, wherein the voltage application device aligns polarization directions of the dielectric crystal in the vertical direction with respect to the surface of the dielectric recording medium.

* * * * *